United States Patent
Kokai et al.

(10) Patent No.: US 9,292,065 B2
(45) Date of Patent: Mar. 22, 2016

(54) SYSTEM AND METHOD FOR PROVIDING LOW-VOLTAGE, SELF-POWERED VOLTAGE MULTI-SENSING FEEDBACK

(71) Applicant: NVIDIA Corporation, Santa Clara, CA (US)

(72) Inventors: George Ferenc Kokai, Cupertino, CA (US); Tezaswi Raja, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 274 days.

(21) Appl. No.: 14/055,790

(22) Filed: Oct. 16, 2013

(65) Prior Publication Data
US 2015/0106634 A1    Apr. 16, 2015

(51) Int. Cl.
*G06F 1/26* (2006.01)
*G05F 1/46* (2006.01)

(52) U.S. Cl.
CPC .. *G06F 1/26* (2013.01); *G05F 1/46* (2013.01); *G05F 1/462* (2013.01)

(58) Field of Classification Search
CPC ............... G06F 1/26; G05F 1/10; G05F 1/46; G05F 1/462
See application file for complete search history.

(56) References Cited

U.S. PATENT DOCUMENTS

| | | | |
|---|---|---|---|
| 2005/0140431 A1* | 6/2005 | Riches | H03H 7/0153 327/553 |
| 2009/0091186 A1* | 4/2009 | Clemo | G06F 1/26 307/31 |
| 2014/0340789 A1* | 11/2014 | Miura | H02P 25/028 360/99.08 |

OTHER PUBLICATIONS

U.S. Appl. No. 13/731,937, filed Dec. 31, 2012.

* cited by examiner

*Primary Examiner* — Dennis M Butler
(74) *Attorney, Agent, or Firm* — Zilka-Kotab, PC

(57) ABSTRACT

A system and method are provided for regulating a supply voltage of a device. The method includes the steps of determining whether a supply voltage for an analog multiplexor is below a threshold voltage. If the supply voltage for the analog multiplexor is below the threshold voltage, then the method includes the step of shorting the supply voltage to an output of the analog multiplexor. However, if the supply voltage for the analog multiplexor is above or equal to the threshold voltage, then the method includes the step of transmitting at least one input signal coupled to the analog multiplexor to the output of the analog multiplexor. A system configured to implement the method may include a power management integrated circuit configured to generate a supply voltage for a device and a device that includes a self-powered analog multiplexor with voltage sensing bypass switch.

20 Claims, 5 Drawing Sheets

SYSTEM AND METHOD FOR PROVIDING LOW-VOLTAGE, SELF-POWERED VOLTAGE MULTI-SENSING FEEDBACK

FIELD OF THE INVENTION

The present invention relates to power management, and more particularly to control signals generated for a power management integrated circuit.

BACKGROUND

Many electronic devices, especially mobile devices that are limited by battery capacity, include an off-chip, power management integrated circuit (PMIC) that is used to generate one or more power supply voltages for a main processor. PMICs may implement one or more of the following functions: voltage regulation, DC to DC conversion, battery charging, power source selection, voltage scaling, and the like. In one mode of operation, the PMIC may be used to provide different voltage levels to a device in order to save power during different types of operation. For example, a processor may be operated at a low frequency under a lower supply voltage during a first mode and a higher frequency under a higher supply voltage during a second mode.

Conventional PMICs require a feedback loop that provides a measurement of the un-gated supply voltage (CVDD) provided by the PMIC. Typical processors may provide this feedback signal by sampling one or more gated voltages on the device using an n-to-1 analog multiplexor. The analog multiplexor shorts any number of the on-chip gated voltage supplies to the feedback input of the PMIC. However, during an initial ramp-up stage of the PMIC, the supply voltage to the analog multiplexor may be below a threshold voltage and, therefore, the analog multiplexor may be uncontrollable because the incoming multiplexor control signals are driven by the ramping supply voltage. Thus, the analog multiplexor may pass-through an unknown output during the ramping stage.

FIG. 1 illustrates a conventional feedback circuit for a PMIC, in accordance with the prior art. The feedback circuit includes a PMIC 50 located off-chip and an analog multiplexor 30 and a plurality of voltage domains (VDn) 10 located on-chip. An input to the PMIC 50 (i.e., V_In) and an output of the PMIC 50 (i.e., V_Out) are coupled to pins on the chip such as solder bumps on a bottom of the package that contains the integrate circuit device. The V_Out signal is the un-gated power supply for the device (CVDD) and the V_In signal is a voltage feedback signal that enables the PMIC 50 to adjust the V_Out signal to meet a target voltage. Each of the voltage domains (i.e., VD1 10(1), VD2 10(2), etc.) are supplied with a gated supply voltage (V_n) that is shorted to CVDD through a switch (VSel_n). The analog multiplexor 30 is coupled to CVDD as a supply voltage and is controlled with one or more control signals (SELn . . . 0).

As shown in FIG. 1, the analog multiplexor 30 receives a supply voltage from CVDD and the control signals are driven via CVDD. However, as explained above, when CVDD is ramping up and below a threshold voltage, the analog multiplexor may have unknown operation. One solution to this problem is to provide the analog multiplexor with an independent supply voltage. The requirements of this supply voltage are that the independent supply voltage is brought up and stabilized before CVDD begins ramping up and only goes down after CVDD goes down. The independent supply voltage would also have to be greater than or equal to CVDD at all times in order to ensure that the n-doped wells of the PMOS (p-type metal oxide semiconductor) devices within the analog multiplexor are not negatively biased. In addition, the output of the analog multiplexor 30 would be required to have electrostatic discharge (ESD) protection such as an ESD clamp, which takes up valuable die real estate. Furthermore, a new solder bump would need to be allocated to bring this new voltage on-chip, which could reduce the integrity of the core supply/ground bump grid of the device. Thus, there is a need for addressing these issues and/or other issues associated with the prior art.

SUMMARY

A system and method are provided for regulating a supply voltage of a device. The method includes the steps of determining whether a supply voltage for an analog multiplexor is below a threshold voltage. If the supply voltage for the analog multiplexor is below the threshold voltage, then the method includes the step of shorting the supply voltage to an output of the analog multiplexor. However, if the supply voltage for the analog multiplexor is above or equal to the threshold voltage, then the method includes the step of transmitting at least one input signal coupled to the analog multiplexor to the output of the analog multiplexor. A system configured to implement the method may include a power management integrated circuit configured to generate a supply voltage for a device and a device that includes a self-powered analog multiplexor with voltage sensing bypass switch.

DETAILED DESCRIPTION

In order to eliminate uncertainty with respect to the output voltage of the analog multiplexor in the feedback circuit, a bypass switch is implemented in parallel with the analog multiplexor that enables the supply voltage provided to the device by the PMIC to be shorted to the output of the analog multiplexor while the supply voltage is ramping up and the logic elements within the analog multiplexor are unstable. The bypass switch is only is operation when CVDD is less than a threshold voltage (i.e., CVDD<$V_{th}$). The bypass switch directly feeds back the output of the PMIC to the feedback input of the PMIC. Once CVDD is greater than the threshold voltage, the bypass switch automatically turns off, enabling the analog multiplexor to select at least one of the gated supply voltages that are transmitted back to the PMIC.

Figure 2:
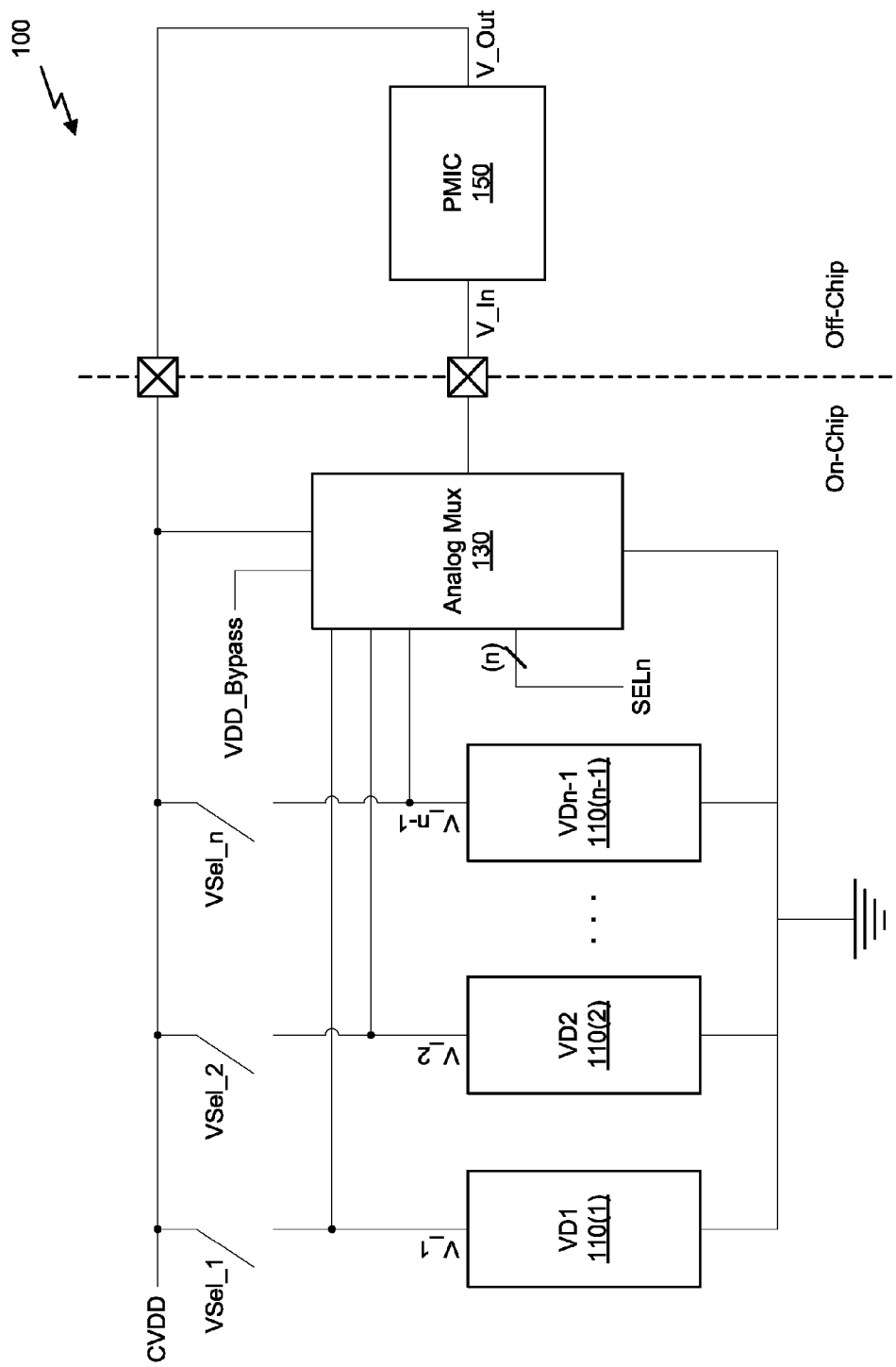
FIG. 2 illustrates a feedback circuit for a PMIC, in accordance with one embodiment.

FIG. 2 illustrates a feedback circuit for a PMIC, in accordance with one embodiment. The PMIC is configured to generate one or more supply voltages for a device. As shown in FIG. 2, the feedback circuit 100 includes a PMIC 150 located off-chip and a self-powered, analog multiplexor 130 that includes a bypass mechanism as well as a plurality of voltage domains 110 located on-chip. The analog multiplexor 130 is configured to short one or more of the gated supply voltages supplied to the voltage domains on the device to the output of the analog multiplexor 130 and, indirectly, the feedback input of the PMIC 150. As described herein, a voltage domain 110 is a set of circuit elements (i.e., logic gates, memory cells, etc.) that share a particular gated supply voltage. Each of the voltage domains (i.e., VD1 10(1), VD2 10(2), etc.) is supplied with a gated supply voltage (i.e., V_1, V_2, etc.) that is shorted to CVDD through a switch (i.e., VSel_1, VSel_2, etc.).

Figure 1:
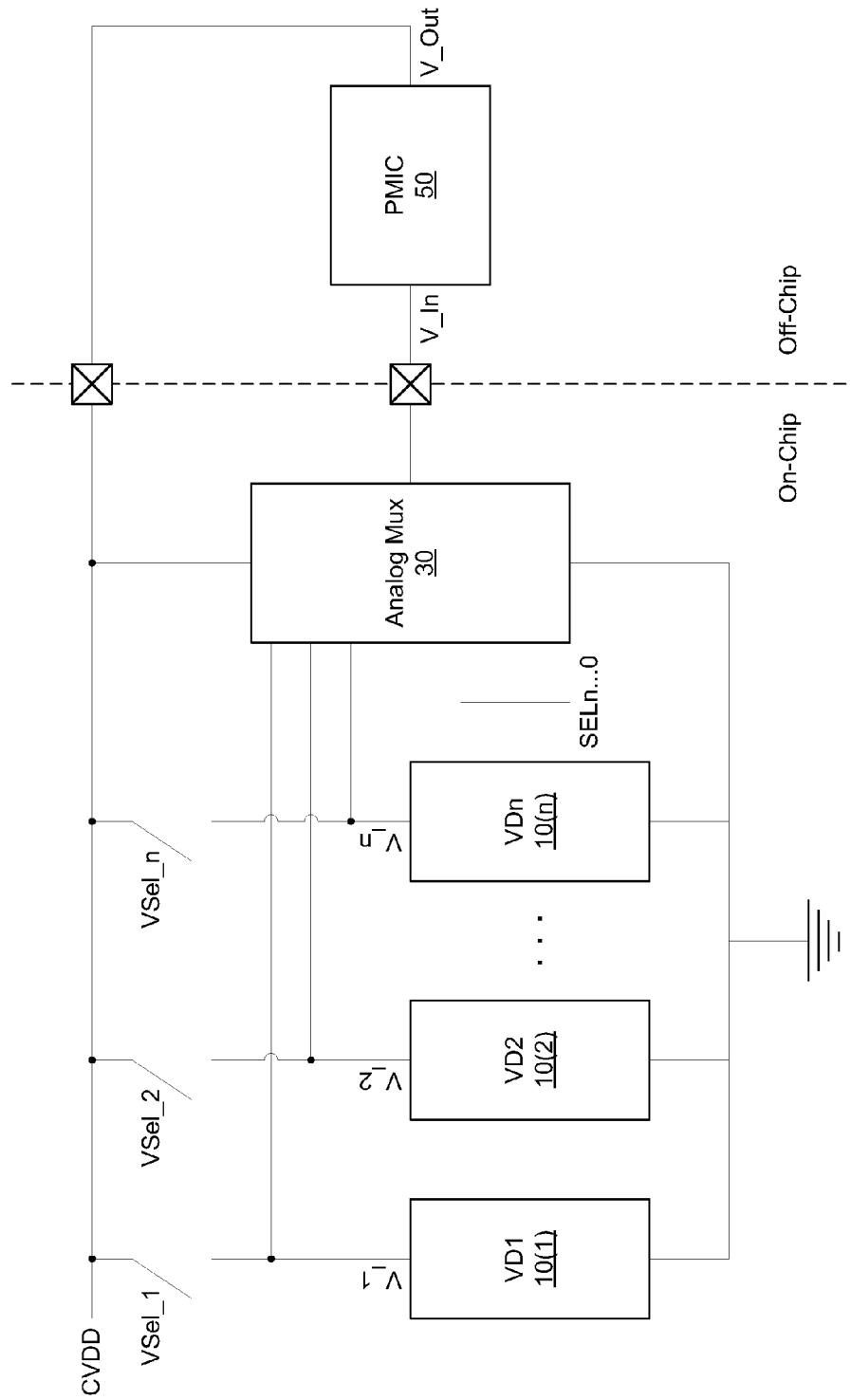
FIG. 1 illustrates a conventional feedback circuit for a PMIC, in accordance with the prior art.

Similar to the feedback circuit of FIG. 1, an input to the PMIC 150 (i.e., V_In) and an output of the PMIC 150 (i.e., V_Out) are coupled to pins or solder bumps provided by a package that contains the device. It will be appreciated that the pins or solder bumps may be interchangeable with any type of pad or chip interface structure that couples signals internal to the device to signals external to the device. In one embodiment, the V_Out signal provided by the PMIC is the un-gated power supply for the device (CVDD) and the V_In signal is a voltage feedback signal that enables the PMIC 150 to adjust the V_Out signal to meet a target voltage. The analog multiplexor 130 is coupled to CVDD as a supply voltage and is controlled with one or more control signals (SELn) driven via CVDD. Thus, when CVDD is below a threshold voltage, the analog multiplexor 130 may not operate normally.

Unlike the feedback circuit of FIG. 1, however, the analog multiplexor 130 is connected to both a supply voltage provided by the PMIC 150 (i.e., CVDD) and a bypass voltage (VDD_Bypass) that is used to supply power to a bypass switch in parallel with the internal logic of the analog multiplexor 130. CVDD provides power to an n-to-1 multiplexor and is used to drive the control signals for the n-to-1 multiplexor while the bypass voltage is only used to turn on a bypass switch that shorts CVDD to the output of the analog multiplexor 130 when CVDD is below a threshold voltage. In one embodiment, CVDD may also be connected to an input of the n-to-1 multiplexor so the ungated supply voltage can be output by the analog multiplexor 130 when none of the switches (i.e., VSel_1, VSel_2, etc.) for the gated supply voltages (i.e., V_1, V_2, etc.) are activated (i.e., all of the voltage domains 110 are inactive). Importantly, the only requirements on the bypass voltage supply is that the voltage is stabilized before CVDD is ramped up and goes down only after CVDD goes down. There is no requirement on the voltage level of the bypass voltage (e.g., VDD_Bypass does not need to be greater than or equal to CVDD during operation) and there is no requirement that the analog multiplexor 130 needs to be located near an ESD clamp for the bypass voltage because the bypass voltage is not output to the PMIC 150, but instead merely allows the CVDD supply voltage to be output to the PMIC 150.

Figure 3:
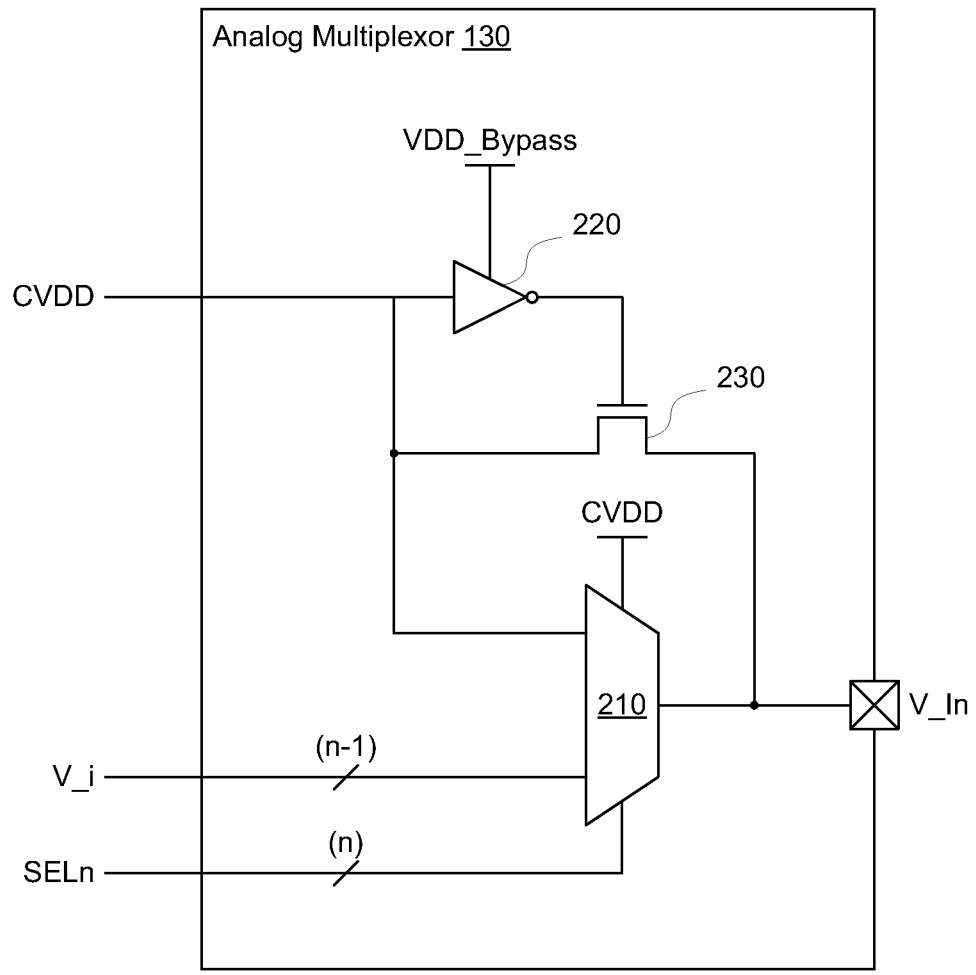
FIG. 3 illustrates a circuit topology of the low-voltage, self-powered analog multiplexor of FIG. 2, in accordance with one embodiment.

FIG. 3 illustrates a circuit topology of the low-voltage, self-powered analog multiplexor 130 of FIG. 2, in accordance with one embodiment. As shown in FIG. 3, the analog multiplexor 130 of FIG. 2 includes an n-to-1 multiplexor 210, as well as an inverter 220 coupled to a gate of a bypass switch 230. In one embodiment, the bypass switch 230 may be a NMOS (n-type metal oxide semiconductor) transistor that has a drain connected to the supply voltage CVDD and a source connected to the output of the analog multiplexor 130. The inverter 220 has an input coupled to the supply voltage CVDD and an output coupled to the gate of the bypass switch 230. In other words, when CVDD is low and ramping up but has not yet hit a threshold voltage, the output of the inverter 220 is high and the gate of the NMOS transistor enables the channel of the transistor to conduct electrons, thereby turning on the bypass switch 230 and coupling the supply voltage CVDD to the output of the analog multiplexor 130. Once CVDD has surpassed the threshold voltage, the output of the inverter 220 is low and the gate of the NMOS transistor disables the channel, turning the bypass switch 230 off providing high impedance between the supply voltage CVDD and the output of the analog multiplexor 130. Once CVDD is above the threshold voltage, the n-to-1 multiplexor 210 may operate normally.

As also shown in FIG. 3, the n-to-1 multiplexor 210 is coupled to n input signals (i.e., n−1 gated supply voltages (V_i) and the un-gated supply voltage CVDD). The n-to-1 multiplexor 210 is supplied by the supply voltage CVDD. Again, before CVDD has ramped up past a threshold voltage, the n-to-1 multiplexor 210 is uncontrollable and the output of the n-to-1 multiplexor 210 may be unknown. However, during this time, the bypass switch 230 is turned on, thereby shorting the supply voltage CVDD to the output of the n-to-1 multiplexor 210, which is coupled to the output of the analog multiplexor 130. Thus, the output of the analog multiplexor 130 will be CVDD when CVDD is less than a threshold voltage and the output of the n-to-1 multiplexor 210 when CVDD is greater than or equal to the threshold voltage.

The inputs of the n-to-1 multiplexor 210 allow the feedback loop to sample the gated voltage from any of the voltage domains 110. In one embodiment, the n-to-1 multiplexor 210 is controlled by n control signals (SELn). The control signals may indicate which of the input signals should be shorted to the output of the n-to-1 multiplexor 210. A single control signal may be driven high at a time to select a single input signal of the n-to-1 multiplexor 210. In another embodiment, multiple input signals may be selected at a single time, effectively shorting the multiple analog input signals and outputting the mean of the selected input signals to the output of the n-to-1 multiplexor 210. In yet another embodiment, fewer control signals may be utilized to select a single particular input signal. In one embodiment, a number of control signals may be used to encode a binary digital signal that encodes an index of the input signal to be selected by the n-to-1 multiplexor 210. For example, three control signals may be used to select between eight distinct input signals.

In one embodiment, the n-to-1 multiplexor 210 comprises n transmission gates (i.e., pass gates or analog switches). A transmission gate comprises a PMOS transistor coupled to an NMOS transistor. When a voltage coupled to the gate of the NMOS transistor is high, a complementary voltage applied to the gate of the PMOS transistor is low and both the NMOS transistor and PMOS transistor pass the signal between the source and drain of the respective transistors. When a voltage coupled to the gate of the NMOS transistor is low, a complementary voltage applied to the gate of the PMOS transistor is high and both the NMOS transistor and PMOS transistor are in a high impedance state such that the signal is not passed between the source and drain of the respective transistors.

The n-to-1 multiplexor 210 is self-powered to ensure that the n-type well in the PMOS transistors is attached to a bias voltage that is always greater than or equal to the voltage coupled to the source of the PMOS transistors. In one embodiment, the n-type well of the PMOS transistors in the n-to-1 multiplexor 210 is biased by the supply voltage (CVDD) generated by the PMIC 150. It will also be appreciated that the control signals are driven in the supply voltage domain (i.e., CVDD) such that, when CVDD is stable, the control signals are driving the transmission gates to the gates' full potential. If the transmission gates were driven by a lower voltage, then the gates may introduce additional impedance to the circuit, which could affect the accuracy of the supply voltage.

In one embodiment, the total resistance in the path from each gated supply voltage (i.e., V_1, V_2, etc.) at the output of the switches (i.e., VSel_1, VSel_2, etc.) to the PMIC 150 should be minimized and that the total resistance for each of the paths should be approximately equal. The paths may include resistances from the on-chip, interconnect path from the switches (i.e., VSel_1, VSel_2, etc.) to the input of the analog multiplexor 130, the on-resistance of the transmission gate within the n-to-1 multiplexor 210, the resistance of the package routing from the output of the analog multiplexor 130 through the package bump or pin, and the resistance of the PCB (printed circuit board) trace from the package to the PMIC 150. By having paths with approximately equal resistance, the averaging accuracy of the n-to-1 multiplexor 210 configured to pass multiple gated supply voltages will be improved.

It will be appreciated that powering the n-to-1 multiplexor 210 using the low-power voltage rail (i.e., CVDD) rather than a higher supply voltage such as 2.5V, 3.3V, or 5V has benefits such as reducing the size of the transmission gates, allowing the analog multiplexor 130 to be placed in more locations within the die, reducing the routing lengths of interconnects from the switches (i.e., VSel_1, VSel_2, etc.) to the input of the analog multiplexor 130, and increasing the likelihood that the total resistance of the different routing paths will be approximately equal.

Figure 4:
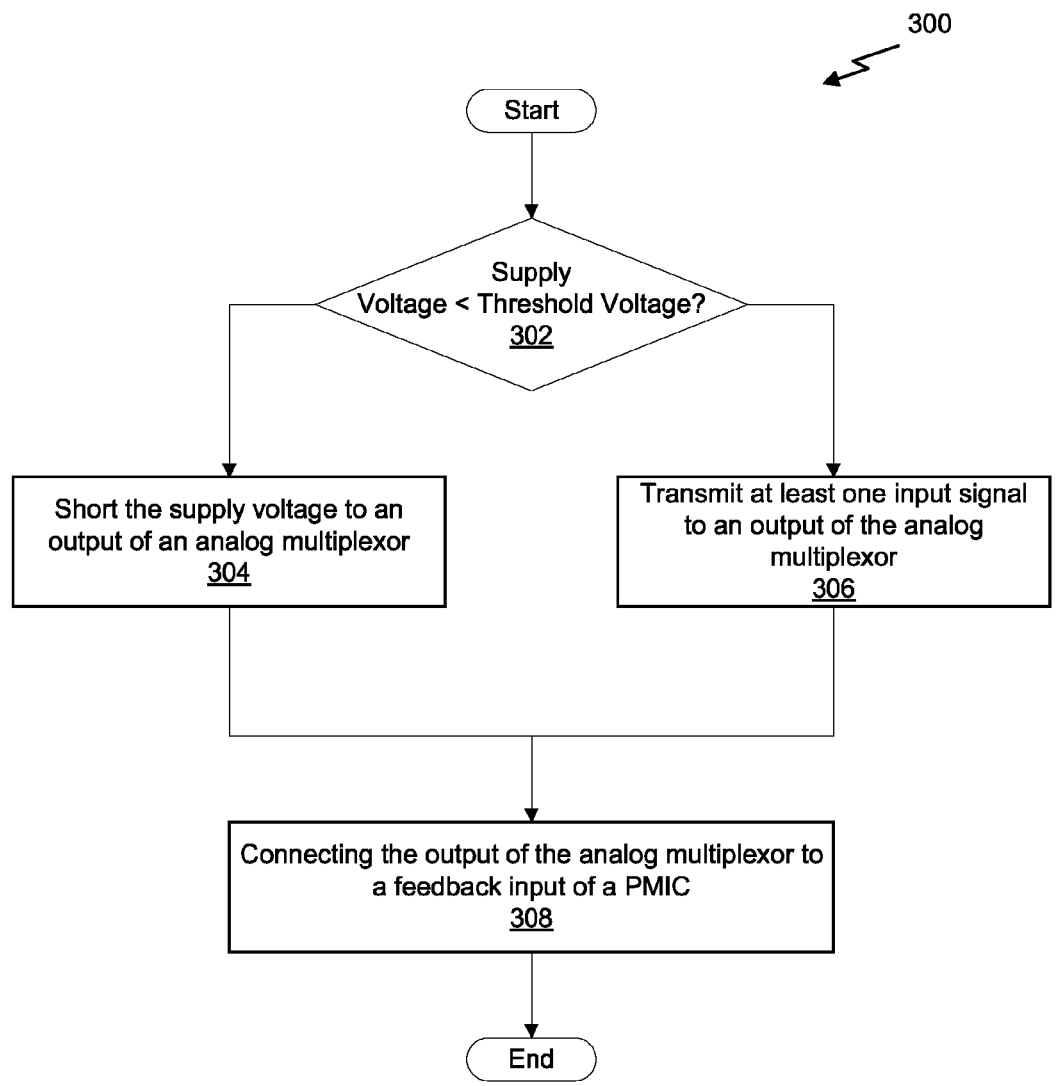
FIG. 4 illustrates a core of the SM of FIG. 3, in accordance with one embodiment.

FIG. 4 illustrates a flowchart for a method 300 for regulating a supply voltage of a device, according to one embodiment. Although the method 300 is described in the context of steps performed by custom circuitry, the method 300 may also be performed by a combination of custom circuitry and a program. At step 302, logic determines whether a supply voltage is below a threshold voltage. In one embodiment, the logic comprises an inverter 220 having an input coupled to the supply voltage and an output coupled to a gate of an NMOS transistor 230. The inverter 220 has a supply coupled to a bypass voltage. The bypass voltage may be generated by a PMIC 150 or may be coupled to a separate supply voltage located on the device. In another embodiment, the logic may be implemented by different circuit elements or may be implemented, at least in part, by a program executed by the device. For example, an Analog-to-Digital (ADC) converter may be used to sample the supply voltage. If the sampled supply voltage is below a threshold level, then the device may set an output signal that is coupled to a switch such as the NMOS transistor 230.

If the supply voltage for the analog multiplexor is below the threshold voltage, then, at step 304, the supply voltage is shorted to the output of an analog multiplexor 130. In one embodiment, step 304 is performed automatically based on the operation of the inverter 220 and the NMOS transistor 230. The inverter output is determined based on whether the inverter input (e.g., supply voltage CVDD) is above a threshold voltage. When the supply voltage is below the threshold voltage, the output of the inverter is driven high and the NMOS transistor 230 is turned on. Returning to step 302, if the supply voltage for the analog multiplexor 130 is greater than or equal to the threshold voltage, then, at step 306, at least one input signal coupled to the analog multiplexor 130 is transmitted to the output of the analog multiplexor 130. When the supply voltage rises above the threshold voltage, the output of the inverter is driven low and the NMOS transistor 230 is turned off, thereby introducing high impedance between the supply voltage and the output of the analog multiplexor 130. Because the supply voltage is above the threshold voltage, the input signals that control the analog multiplexor 130 are stable enough to control the analog multiplexor 130 and operation proceeds as normal. At step 308, the output of the analog multiplexor 130 is coupled to a feedback input of a PMIC 150. This feedback loop enables the PMIC to regulate the supply voltage based on the operating state of the device.

Figure 5:
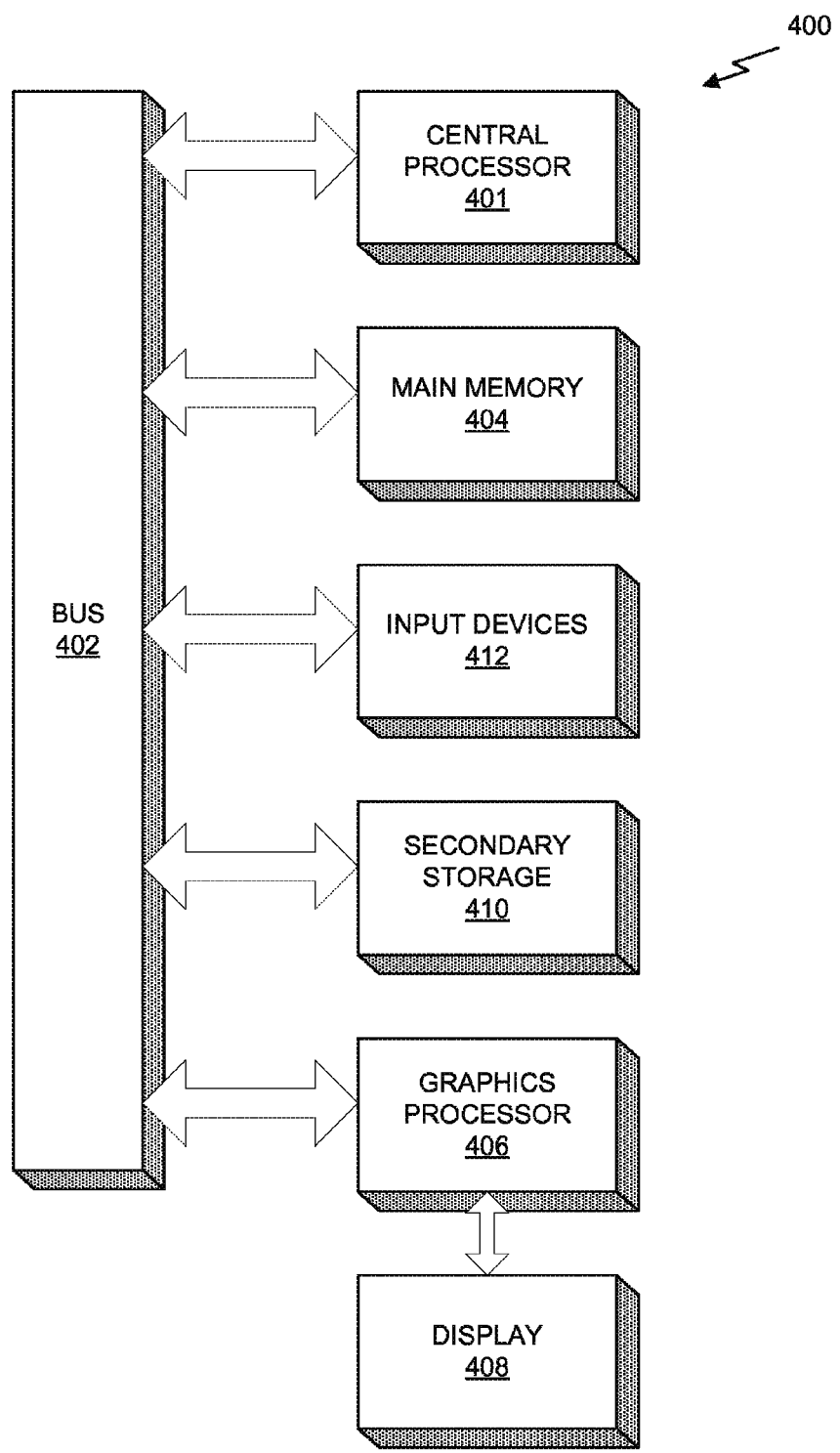
FIG. 5 illustrates an exemplary system in which the various architecture and/or functionality of the various previous embodiments may be implemented.

FIG. 5 illustrates an exemplary system 400 in which the various architecture and/or functionality of the various previous embodiments may be implemented. As shown, a system 400 is provided including at least one central processor 401 that is connected to a communication bus 402. The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM).

The system 400 also includes input devices 412, a graphics processor 406, and a display 408, i.e. a conventional CRT (cathode ray tube), LCD (liquid crystal display), LED (light emitting diode), plasma display or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. The memory 404, the storage 410, and/or any other storage are possible examples of computer-readable media.

In one embodiment, the architecture and/or functionality of the various previous figures may be implemented in the context of the central processor 401, the graphics processor 406, an integrated circuit (not shown) that is capable of at least a portion of the capabilities of both the central processor 401 and the graphics processor 406, a chipset (i.e., a group of integrated circuits designed to work and sold as a unit for performing related functions, etc.), and/or any other integrated circuit for that matter. For example, a PMIC 150 may be coupled to the graphics processor 406 on a graphics card included in the system 400. The graphics processor 406 may implement the analog multiplexor 130 and the one or more voltage domains 110 of the feedback circuit 100.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, server, workstation, game consoles, embedded system, and/or any other type of logic. Still yet, the system 400 may take the form of various other devices including, but not limited to a personal digital assistant (PDA) device, a mobile phone device, a television, etc.

Further, while not shown, the system 400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   determining whether a supply voltage for an analog multiplexor is below a threshold voltage; and
   if the supply voltage for the analog multiplexor is below the threshold voltage, then shorting the supply voltage to an output of the analog multiplexor, or
   if the supply voltage for the analog multiplexor is above or equal to the threshold voltage, then transmitting at least one input signal coupled to the analog multiplexor to the output of the analog multiplexor,
   wherein the analog multiplexor includes a plurality of p-type metal oxide semiconductor (PMOS) transistors, each PMOS transistor having an n-type well biased by the supply voltage.

2. The method of claim 1, wherein the analog multiplexor comprises a number of transmission gates coupled to a corresponding number of input signals.

3. The method of claim 2, wherein the input signals include at least one gated supply voltage and an un-gated supply voltage.

4. The method of claim 1, wherein determining whether the supply voltage for the analog multiplexor is below the threshold voltage comprises coupling the supply voltage to an input of an inverter, coupling the output of the inverter to a bypass switch, and coupling a supply of the inverter to a bypass voltage.

5. The method of claim 4, wherein the bypass switch comprises an n-type metal oxide semiconductor (NMOS) transistor.

6. The method of claim 5, wherein the NMOS transistor has a source coupled to the output of the analog multiplexor and a drain coupled to the supply voltage.

7. The method of claim 1, further comprising connecting the output of the analog multiplexor to a feedback input of a power management integrated circuit (PMIC).

8. The method of claim 7, wherein the PMIC is configured to generate the supply voltage at a target voltage level.

9. The method of claim 1, further comprising, if the supply voltage for the analog multiplexor is above or equal to the threshold voltage, transmitting one or more control signals to the analog multiplexor to select the at least one input signal.

10. The method of claim 9, wherein the one or more control signals are driven via the supply voltage.

11. A system comprising:
    a power management integrated circuit (PMIC) configured to generate a supply voltage; and
    an analog multiplexor coupled to the supply voltage, the analog multiplexor including:
        an n-to-1 multiplexor comprising a number of transmission gates coupled to a corresponding number of input signals, and
        a bypass switch configured to short the supply voltage to an output of the analog multiplexor when the supply voltage is below a threshold voltage,
    wherein the analog multiplexor includes a plurality of p-type metal oxide semiconductor (PMOS) transistors, each PMOS transistor having an n-type well biased by the supply voltage.

12. The system of claim 11, wherein the bypass switch comprises an n-type metal oxide semiconductor (NMOS) transistor.

13. The system of claim 11, wherein the analog multiplexor further includes an inverter that has an input coupled to the supply voltage and an output coupled to the output of the analog multiplexor, and wherein a supply of the inverter is coupled to a bypass voltage.

14. The system of claim 13, wherein the bypass voltage is stabilized prior to the supply voltage being brought up, and wherein the bypass voltage is taken down only after the supply voltage is taken down.

15. The system of claim 13, wherein the PMIC is also configured to generate the bypass voltage.

16. The system of claim 11, wherein the n-to-1 multiplexor is coupled to one or more control signals configured to turn on at least one transmission gate of the number of transmission gates to couple at least one input signal to the output of the analog multiplexor.

17. The system of claim 16, wherein the one or more control signals are driven by the supply voltage.

18. The system of claim 11, wherein the PMIC is implemented on a distinct semiconductor substrate from the analog multiplexor.

19. The system of claim 18, wherein the output of the analog multiplexor is coupled to a feedback input of the PMIC via a solder bump on a package that includes an integrated circuit that includes the analog multiplexor.

20. The system of claim 11, wherein the PMIC is configured to generate the supply voltage at a target voltage level.

* * * * *